United States Patent [19]
McAllister et al.

[11] Patent Number: 5,331,488
[45] Date of Patent: Jul. 19, 1994

[54] FIXED HARD DISK DRIVE HAVING A REMOVABLE INTEGRATED DISC STACK STRUCTURE

[75] Inventors: Jeffrey S. McAllister; J. Todd Cramer, both of Boise, Id.

[73] Assignee: Hewlett-Packard Company, Palo Alto, Calif.

[21] Appl. No.: 893,305

[22] Filed: Jun. 4, 1992

[51] Int. Cl.$^5$ ............................................. G11B 5/012
[52] U.S. Cl. .................................................. 360/98.08
[58] Field of Search .............. 360/98.07, 98.08, 99.08, 360/99.12

[56] References Cited

U.S. PATENT DOCUMENTS

| | | | |
|---|---|---|---|
| 3,587,074 | 6/1971 | Angle et al. | 360/99.08 |
| 4,337,491 | 6/1982 | Hasler et al. | 360/99.08 |
| 4,445,157 | 4/1984 | Takahashi | 360/98.08 |
| 4,616,278 | 10/1986 | Yamaguchi et al. | 360/99.12 |
| 4,661,875 | 4/1987 | Kinjo | 360/98.08 |
| 4,847,712 | 7/1989 | Crapo | 360/99.08 |
| 4,945,432 | 7/1990 | Matsudaira et al. | 360/98.02 |
| 5,031,062 | 7/1991 | Wood et al. | 360/98.08 |

FOREIGN PATENT DOCUMENTS 0301829 1/1989 European Pat. Off. .
386971 12/1990 European Pat. Off. .
61-239484 10/1986 Japan ..................... 360/98.08
63-103487 5/1988 Japan .
1232587 9/1989 Japan .
2158633 11/1985 United Kingdom .

*Primary Examiner*—John J. Vrablik
*Attorney, Agent, or Firm*—E. F. Oberheim

[57] ABSTRACT

A hard disk drive, having a removable hard disk stack or assembly in which one or more hard disks are bonded by a compliant bonding agent to a circular hub. Bonding of the hard disk(s) to the hub is the sole support of the hard disks. The circular hub has a center section which is secured by screw threaded attachment to a rotatable member of a motor for rotation at constant speed. The hub center section is of sufficient strength not to deflect in the presence of securing forces. The integrated hard disk(s) and hub provide a hard disk assembly or hard disk stack which, when the hub is attached to the rotatable member, functions as a fixed hard disk assembly providing a fixed, hard disk drive function, while affording ease of removal of the integrated, hard disk assembly for replacement or repair. The hard disk assembly is ideally suited for application in small form factor hard disk drives, less than the 3½ inch form factor, for example, in the one to two inch form factor range.

10 Claims, 1 Drawing Sheet

FIXED HARD DISK DRIVE HAVING A REMOVABLE INTEGRATED DISC STACK STRUCTURE

TECHNICAL FIELD

This invention relates generally to fixed disk stack structures of single or multiple hard disks in a disk drive.

BACKGROUND OF THE INVENTION

Conventional fixed, hard memory disk stacks employ clamping arrangements in which one or more hard disks are clamped between a flange at one end of a disk bearing hub and a clamp attached as by screws, to the other end of the disk bearing hub. Such an arrangement, referenced as prior art, appears in FIG. 1 of U.S. Pat. No. 4,945,432, to Matsudaira et al in which the disks are concentrically disposed of the axis of rotation of a disk bearing hub and are axially spaced by spacer rings in a stack between a bottom flange on the hub and a top clamp which is attached to the hub. The application of clamping forces to the top disk of the disk stack, or to a single disk, in the case where only one disk is used, often distorts the plane of the disk(s), resulting in axial displacement of portions of the disk surface which curves the disk surface in a circumferential direction. Clamping forces on the disk also cause disk runout, i.e., radial displacement from concentricity. In a fixed, hard disk stack structure of multiple disks, such disk clamping frequently causes relative circumferential displacement among the disks.

In prior art hard disk stacks of the type described, stresses from mechanical shock and stresses from thermal cycling are also frequent causes of disk displacement relative to the hub and to one another. Stresses at joints between the engaged faces of the disks and hub and the disks and spacer rings, resulting from either mechanical shock or differing thermal dimensional responses, result in slip at the interfaces causing unacceptable misregistration.

While such fixed hard disk stack assemblies have found extensive use in disk drives where, for the storage density, the described displacements were within acceptable limits, they are not usable in smaller drives, or, more generally, in any disk drive of higher track and bit densities, in which misregistration tolerances are less than the described displacements.

The invention described in the patent to Matsudaira et al employs a compliant adhesive or compliant washers or O rings in conjunction with metal spacers for the purpose of mounting glass or ceramic disks in a disk stack. The purpose being to provide an axially yielding, variable disk clamping dimension between the ends of the disk bearing hub, to provide axial compliance in a degree to avoid breaking or loosening of the fragile disks in the presence of varying environmental temperatures. The prior art disk clamping structure for clamping the disk stack between a flange at one end of the disk bearing hub and a clamp at the other end, while also employed by Matsudaira et al to integrate the disk stack and the hub, does not fracture the disks as the clamping dimension changes with changes in temperature, since the compliant washers, O-rings, or adhesive, or combinations thereof, are stated to compress or expand in the degree required to hold disk clamping pressures within acceptable functional limits.

The thrust of the Matsudaira et al disclosure resides in the provision of disk stack structures which have axial compliance. This assembly poses problems, however, since the disk stack, i.e., disks and spacer rings must be unclamped from the hub to be removed for repairs or replacement. This destroys the structural integrity of the memory disk structure. Thus Matsudaira et al, present no teaching of a disk stack structure in which there is no clamping pressure or force on the disks when installed.

Further, in the teaching of Matsudaira et al, there is no thought given to the use of an adhesive as the sole means for attaching the disks to a rotatable body to form an integrated memory disk structure, or of providing such a disk stack structure which is detachable as an assembled unit from a disk spindle or bearing housing.

U.S. Pat. No. 5,031,062 to Joseph A. Wood et al, like Matsudaira et al, employs an adhesive in a disk stack assembly but for a different purpose. Wood et al are concerned with reapplying of the disk surface under clamping pressure and for this reason employs a flowable filler material, preferably an adhesive, which "reduces any differences in the surface topography of the disk and the accompanying clamping-related parts." The adhesive is applied to a spacer ring which spaces the disks on the hub and are stacked on the hub with the spacer therebetween after which clamping pressure is applied by a clamp ring. Here again there is no teaching presented of a disk stack structure in which there is no clamping pressure or force on the disks when installed.

In rigid or hard disk drives in which the disk assembly is provided as a disk cartridge, the cartridge may be inserted and removed from the drive. Such disk cartridge structures, whether employing single or multiple disks, while affording ease of insertion and removal of the disks, lack the overall structural integrity of a fixed hard disk drive and are not functionally adaptable to small form factor disk drives, such as those smaller than the 3½ inch form factor.

Flexible disks, also known as floppy disks, are provided in protective covers or jackets and are commercially available in single disk packages. Typical structures are described in U.S. Pat. Nos. 4,704,181 (Kubo), U.S. Pat. No. 4,670,803 (DeMoss et al), U.S. Pat. No. 4,794,480 (Jones et al) and U.S. Pat. No. 4,562,505 (Mroz). These are insertable and removable floppy disk structures which function as data storage units in computers and data processors. The jackets have openings for admitting at least a drive spindle to the disk and a read/write head. The undesirable wear of the disks where they are engaged by the spindle, is noted by the patentee Mroz together with prior art attempts to avoid such wear, describing the use of adhesives to attach reinforcing members, mechanical clamps for attaching reinforcing members and the use of microscopic spot welding for reinforcements.

The shortcomings of such prior art approaches are noted. Such shortcomings are said to be overcome by the patented arrangement of Mroz, in which a plastic disk is positioned concentrically between a metallic hub and a metallic ring. The hub and the ring are joined by laser welds which extend between the hub and the rings through the disk.

In all instances such reinforcements are independent of reinforcements on other disks. There is no integration of disks in a disk stack in these assemblies.

SUMMARY OF THE INVENTION

A fixed, hard disk drive is provided having a fixed, easily removable, integrated hard disk structure of one, or more disks. The integrated disk structure comprises a substantially circular disk support member or hub having at least one annular disk mounting surface adjacent a peripheral edge. A hard disk having a center opening of lesser diameter than the diameter of the circular hub has an annular surface adjacent said central opening which is bonded, preferably by a compliant adhesive, to the annular hard disk mounting surface on the support member or hub. The disk support member or hub is concentrically positioned with respect to and secured to a rotatable disk mounting member in the disk drive, such as the rotor shaft or spindle of a DC motor, as will be described.

In the best mode presently known for practicing the invention, the circular disk hub comprises a circular body of substantially cup-shaped cross section, defining axially spaced, annular disk mounting surfaces to each of which a hard disk is adhesively bonded in a position concentric with the axis of the circular hub. The cup shaped annular cavity of the disk hub is a slip fit over a cylindrical end of a motor rotor spindle or shaft where it is concentrically positioned. A centrally mounted screw, or a plurality of symmetrically located screws, are employed to secure the disk hub to the cylindrical end of the spindle or shaft, in which position the inner planar face of the cup seats upon and is frictionally secured against the end face of the spindle or shaft. The hard disks do not contact any part of the spindle. The only contact force on the hard disks in the drive is the contact force of the transducers in their parked position when assembly is complete.

Alternatively, the cup shaped disk support member or hub may be internally threaded to engage external threads on the cylindrical end of the motor spindle or shaft, to be threaded thereover and thereby to be conveniently secured concentrically to the motor rotor shaft.

Such a fixed hard disk stack structure in a disk drive is easily installed and removed. In such a drive, the rotary or linear actuator is displaced angularly or linearly to clear the heads from the hard disks, after which the disk hub is easily removed from the motor spindle or shaft. The hard disk assembly or stack during installation and removal always remains an integral assembly.

BRIEF DESCRIPTION OF THE DRAWINGS

The invention will be better understood by reference to the following specification when considered in conjunction with the accompanying drawings, in which.

BEST MODE FOR PRACTICING THE INVENTION

Disk assemblies or stacks of the prior art are not compatible with disk drives of reduced form factor, for example, 1 or 2 inch form factors. Current developments, producing drives having hard disks of diameters in the range of one to two inches, require implementations of lesser part count and complexity than those of the larger drives. Pluralities of parts in prior art disk drives are not conveniently scaled down and assembled in the smaller scale hard disk stacks with the necessary degree of structural integrity, or, of dimensional precision or stability to be acceptable.

Although the patentee Mroz regards the use of adhesives in disk stack assemblies as involving cumbersome manufacturing processes with attendant problems of contamination, requiring special care in maintaining cleanliness, the applicant on the contrary, finds the use of a compliant adhesive in fabricating a hard disk assembly or stack in a small form factor drive, to be convenient, to simplify fabrication, and to permit repetitive fabrication of high precision hard disk assemblies, whether involving one or more hard disks, which in structural integrity and dimensional stability, far exceed any performance requirements in the functional environment of the drive.

A compliant adhesive as used here is defined as an adhesive which does not fracture, or shear, or suffer bond failures at the joined interfaces, in the presence of relative displacement of the interfaces due to dimensional changes in the presence of thermal cycling or interface displacement in the presence of mechanical shock, in that degree required to obviate slip between the interfaces, while having a memory of the initial relative position of the interfaces.

Figure 1:
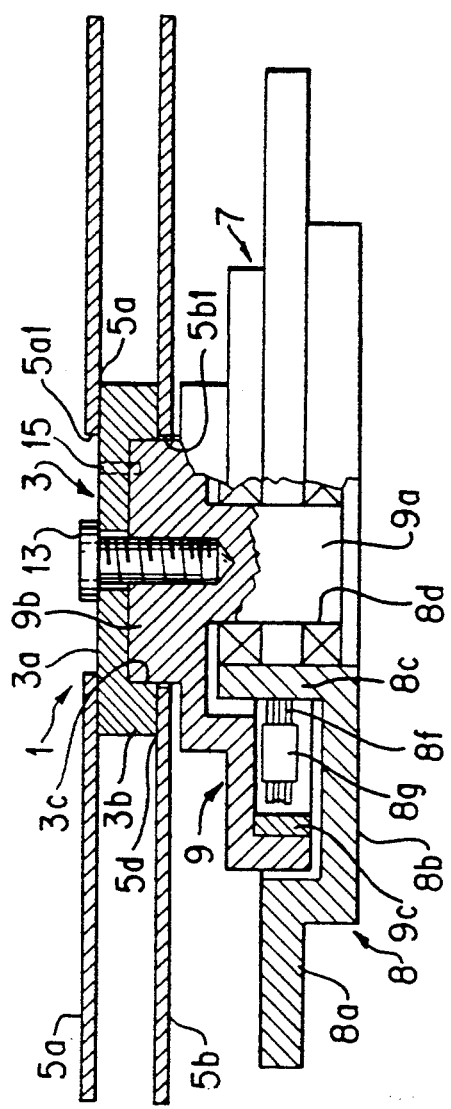
FIG. 1 is a side view, partially in section, of a disk stack, representing a first embodiment of this invention.
Figure 2:
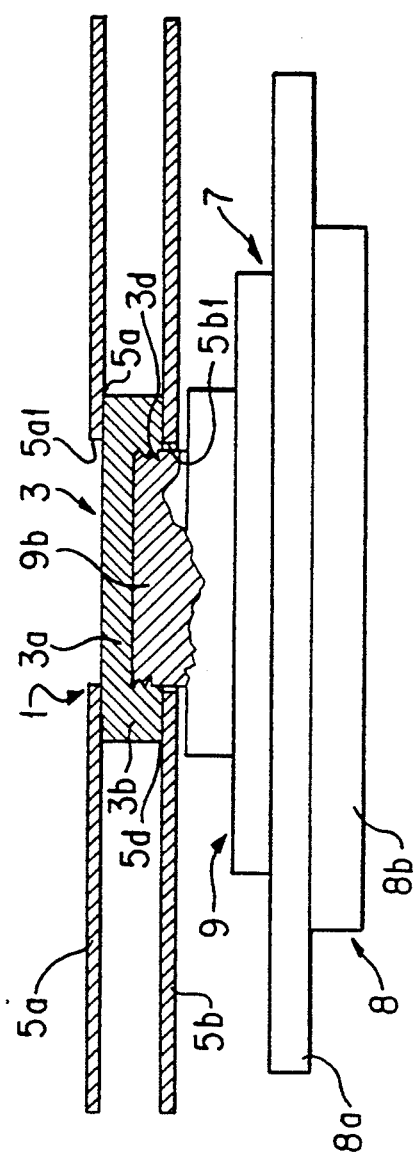
FIG. 2 is a side view, partially in section, of a second embodiment of this invention.

FIGS. 1 and 2 depict the presently known best mode for practicing this invention in two different specific structural configurations for achieving concentricity and integration of the hard disk assembly on the bearing housing.

The hard disk stack assembly 1 in each of FIGS. 1 and 2 comprises a circular hub 3, preferably of metal, but which may also be fabricated of a plastic material which is dimensional stable in the hard disk drive environment. The circular hub 3 is of an inverted cup-shaped configuration in cross section, comprising a disk 3a and a depending annulus 3b which latter defines a cup-shaped annular cavity 3c. The upper surface of the disk 3a and the bottom surface of the depending annulus 3b define axially spaced surfaces to which respective hard disks 5a and 5b are bonded. The axial dimension between the axially spaced surfaces of the hub is determined by the desired spacing of the confronting surfaces of the hard disks to be bonded to the axially spaced surfaces of the hub.

The hard disks 5a and 5b may be of any suitable size and any suitable material. As to size, although not so limited, the invention is uniquely adapted for the fabrication of small form factor hard disk assemblies, examples being 1.3 and 1.8 inch form factors in which hard disks of about 34 and 48 mm, respectively may be used. As to hard disk material, aluminum, glass, and ceramics are applicable, as are other materials having physical properties meeting the requirements of the hard disk function in the disk drive environment.

Bonding of the hard disks to the circular hub 3 is achieved by any acceptably compliant adhesive or bonding agent, the physical properties of which meet the stated requirements and which neither degrade in nor are hostile to the environment. Tested adhesives or bonding agents, include, the Black Max adhesive of the Loctite Corporation and the Eccobond 45 adhesive of Emerson and Cuming, Inc. of which the Eccobond 45 adhesive is presently preferred.

The hard disks 5a and 5b have central circular openings 5a1 and 5b1 respectively, of lesser diameter than the outside diameter of the circular hub 3 and have annular surfaces adjacent and about the central circular openings which overlap the corresponding top and bottom annular surfaces of the disk 3a and the depending annulus 3b, respectively, at the peripheral edge of the disk 3a. The annular surfaces to be bonded must be mechanically and chemically clean. A bonding agent, such as a compliant adhesive, is applied to one or both of the annular surfaces to be bonded together. Concentricity is achieved by concentrically positioning the hard disks 5a and 5b, with respect to the cylindrical hub 3, using jigs. Thereafter bonding pressure is applied and also heat, if required, forming the bond 5d between the annular surfaces. Concentricity may be achieved other than with jigs by providing a concentric circular flange on each of the axially spaced surfaces of the circular hub 3 having a close tolerance fit with the central circular openings, 5a1, 5b1, of the respective hard disks 5a and 5b.

Bonding of the hard disks to the opposite surfaces of the circular hub (spacer ring) is achieved by any compliant adhesive, the physical properties of which do not degrade in the environment or cause any degrading of the hard disk drive function once sealed inside the hard disk drive. Desirable adhesive properties are sufficient resilience to withstand dimensional changes encountered during thermal cycling and sufficient strength to withstand acceleration forces encountered in shock and vibration conditions without evidence of deformation or loss of bond strength.

Loctite Corporation produces a cyano-acrylate type adhesive that was used for early prototypes, including at least one disk drive that was tested to 100,000 start/stop cycles. The product is called the "Black Max" adhesive. The Black Max adhesive, used with the recommended adhesive activator component, provides strong disk-to-hub bonding with very rapid adhesive curing. However, the outgassing properties of the Black Max adhesive may pose a risk to disk drive function due to the potential for volatile adhesive components to escape the bond area and form contaminating spots that can cause head/media interactions.

The spacer ring or hub first used with the Black Max adhesive in these experiments was made of a 300 series stainless steel. It had two raised concentric rings machined as an integral part of the hub that defined therebetween a volume reservoir to contain the adhesive and determined the bond line thickness of about 0.002 in. Hard disk flatness is not easily maintained within acceptable limits with the combination of the Black Max and the hub having the concentric rings.

The concentric ring disk hub design was replaced by a 300 series stainless steel hub having only a flat surface contacting a hard disk surface. The flat surfaces were lapped to achieve the best obtainable flatness. The hard disk flatness using this implementation and procedure is within acceptable limits.

In order to maintain mass balance of the disk stack or assembly, the hard disk(s) and the hub must be assembled concentrically. An off-axis hard disk will impart vibrations that are detrimental to drive function. Jigs or fixed tooling are used to achieve concentricity of the hard disk(s) and the hub.

During the time the adhesive is curing the hard disk and hub assembly must be held rigid and under pressure in a fixture to assure that concentricity is achieved and is maintained, and that bond thickness is controlled. Presently this is done with an OD centering tool for the hub and hard disk(s) and a 50-gram weight placed atop the uppermost disk.

A second adhesive type that is presently preferred is a 2-part epoxy resin cured either at room temperature for 24 hours, or cured in a particle-free oven at 70 degrees C. for 40 minutes. Emerson & Cuming, Inc. produces a product that is suitable for this application. It is called Eccobond 45, clear formulation. Two hard disk drives have been run well in excess of 100,000 start/stop cycles employing hard disk assemblies bonded by the Eccobond 45 epoxy as the adhesive or bonding agent. A third hard disk drive still in the test process, is past 60,000 start/stop cycles with no evidence of malfunction.

An Eccobond 45 epoxy mixing ratio of 1 part resin to 2 parts catalyst, cured at 70° C. for 40 minutes is presently preferred for hard disk/hub bonding. Hard disk/hub bonds of adequate strength and flexibility combined with low adhesive outgassing are achieved. Flatness of the bonded hard disks is within limits permitting acceptable head flight performance.

The process steps for making the epoxy hard disk assemblies are listed below:

1. Clean the stainless steel disk hub with isopropyl alcohol and wipe with a particle-free cloth. Hard disks are bonded in the condition received from the manufacturer. Hard disk handling should be minimized.

2. Mix the Eccobond 45 clear epoxy in the ratio of 1 part by weight of resin to 2 parts by weight of catalyst. The pot life is 2–3 hours.

3. With a glass rod or similar tool, transfer enough mixed epoxy to make a dab about 0.5 cm in diameter onto a clean flat surface, such as a glass slide or plate.

4. Using a second glass slide squeegee the epoxy dab on the first glass slide to make a film having a thickness of about 0.002 inches. The thickness can be controlled by using boss surfaces on the glass plate of about 0.002 inches higher than the glass surface, and drawing the squeegee over the bosses while evenly spreading the thin film of adhesive.

5. Transfer a circle or ring of epoxy material from the glass slide to the hard disk surface using a stainless steel stamp having a raised concentric ring on one end face. Touch the ring to the adhesive film to pick up a charge of adhesive. Then touch the adhesive-charged ring of the stamp to the hard disk surface to apply the adhesive. A stamp centering fixture is needed to achieve accurate concentric adhesive placement on the hard disk.

The end face of the ring on the transfer stamp is 0.4 mm wide, with an ID of 9.6 mm and OD of 10.0 mm in one specific application.

The width of the adhesive ring on the hard disk is 0.4 to 0.5 mm, and the ring of adhesive is centered approximately in the middle of the annular disk area covered by the hub. Epoxy too close to the hard disk ID can allow epoxy to squeeze out, which may bond the hard disk assembly to the fixture. Epoxy too close to the OD can squeeze out onto the hard disk surface, impeding head flight and function.

The adhesive thickness in the bond ring is approximately 10 to 12 microns.

6. Concentrically place the disk hub onto the adhesive ring on the hard disk. Apply adhesive to the second hard disk in the same fashion as the first, then concentrically place the second hard disk onto the hub.

7. Compress the hard disk/hub assembly together by applying a distributed force of about 50 grams to the upper hard disk of the assembly in the region of the bond ring. A 50 gram weight atop the upper hard disk straddling the bonding area is suitable for this purpose.

The assembly is cured in a particle free oven for about 40 minutes at about 70 degrees C.

It has been found that mixing the Eccobond 45 epoxy in the ratio of 1 part resin to 1 part catalyst produces a stiffer bond. However, the stiffer bond does not preserve disk flatness when subjected to a condition of 85 degrees C. and 85% relative humidity. Eccobond 45 epoxy used in the 1:2 ratio or 1:3 ratio is more flexible and the hard disks remain substantially flat when subjected to high temperature and humidity.

The application of adhesive using the stamp ring and transfer method described herein is presently preferred. Alternatively a syringe loaded with adhesive and driven by air pressure can be used. The x-y-z motion of the syringe can be controlled by readily available dispensing equipment or the disk rotated with respect to the syringe.

In production, disk hub cleaning is expected to be done using an aqueous cleaning system in an automatic washing machine.

The hard disk assembly 1 is driven by a motor 7 comprising a stator 8 and a rotor 9. The stator 8 comprises a stator plate 8a having a base portion 8b, forming part of a base for the disk drive, or secured to such base. The disk drive housing is not shown. A central tubular bearing housing 8c is an integral part of the stator base portion 8b. A motor spindle or shaft 9a is a concentric, integral part of the motor rotor 9 and is journaled in an axially spaced bearing pair 8d in the tubular bearing housing 8c. The stator 8 of the motor 7 comprises a magnetic core having a plurality of equally, circumferentially spaced, salient poles 8f, supported by the tubular bearing housing 8c. Individual coils 8g are disposed on the salient poles. The rotor 9 is umbrella shaped and peripherally carries a ring magnet 9c which circles the tips of the salient poles. The ring magnet is spot magnetized, as is well known. The motor functions as a brushless DC motor which operates at a constant speed. This type of motor is known as a sensorless DC disk spindle motor. In the preferred embodiment, the motor comprises nine salient stator poles, each with a winding 8g, and a rotor ring 9c of magnetic material, having twelve equally, circumferentially spaced magnetic poles, alternately magnetized N-S, S-N, in the radial direction. The rotor 9 is of carbon steel, or of a magnetizable stainless steel and is the outer flux return path of the motor.

The upper end 9b of the spindle or shaft 9a is cylindrical and is a slip fit within the cup shaped annular cavity 3c of the circular hub 3, which concentrically positions the disk stack 1 with respect to motor rotor 9. Integration is achieved by means of a fastener such as a screw or a bolt 13 centrally disposed of the assembly, clearing through the disk 3a of the circular hub 3 and axially threading into the cylindrical end 9b of the motor shaft 9a Several symmetrically located bolts or screws may be employed in the alternative.

The thickness of the disk 3a of the circular hub 3 is such that the clamping forces of one or more screws or bolts 13 will not distort the circular hub 3.

In FIG. 2 the annulus 3b of the circular hub 3 is internally threaded and the cylindrical end 9b of the motor spindle or shaft 9a is externally threaded. Concentric positioning of the parts and the integration of the parts is simultaneously achieved when the circular hub is threaded on and seated on the end face of the cylindrical end 9b of the motor spindle or shaft 9a. Precise concentricity is assured by providing a smooth annular surface 3d at the end of the annulus 3b, which is a slip fit over the cylindrical end 9b of the spindle or shaft 9a.

Although the invention has been illustrated in connection with a hard disk stack involving two disks, it will be apparent to those skilled in the art that the hard disk stack structure which is illustrated may be duplicated and spacer washers disposed between the hubs to properly space the hard disks of successive hard disk stacks from those of the present hard disk. In such a construction all clamping pressure and integration takes place between the disk portions 3a of the circular hubs 3.

Still further, the invention may be practiced with a single hard disk where storage capacity requirements do not exceed the capacity of a single hard disk or with a hard disk stack of the type of either FIGS. 1 or 2 and a succeeding hard disk assembly embodying a circular hub and a single disk in addition to that assembly involving 2 disks.

Also, while the invention has been described as being particularly useful in small form factor ranges such as 1 to 2 inch form factors, particularly naming 1.3 inch and 1.8 inch form factors, it is readily apparent that form factor size is limited primarily only by the bonding strength of the bonding agent for the available bonding surface material.

These and other variations of the invention, while practicing the spirit and scope of the invention, represented in a hard disk assembly in which there is no clamping pressure on the disks, will be readily apparent to those skilled in the art.

We claim:

1. In a hard disk drive, a hard disk stack structure comprising:
   a. a substantially circular hub having opposite axially spaced surfaces;
   b. at least one hard disk having a central circular opening of lesser diameter than the diameter of said circular hub; and
   c. a compliant bonding agent bonding said hard disk adjacent said circular opening to one of said axially spaced surfaces, concentrically with respect to the center of said circular hub and functioning as the sole attachment of said hard disk to said hub.

2. The invention according to claim 1, in which:
   a. said compliant bonding agent bonding said hard disk adjacent said circular opening comprises a ring of bonding agent concentrically disposed of said circular opening, having an inner diameter greater than said central circular opening of said hard disk and having an outer diameter less than the outer diameter of said circular hub.

3. The invention according to claim 2, in which:
   a. said bonding agent comprises a two part epoxy resin, comprising resin and a catalyst, mixed in a ration of resin to catalyst by weight in a ratio range of about 1:1.5 to 1:3.

4. In a hard disk drive, a hard disk stack structure, comprising:
   a. a rotatable member rotatable about an axis;
   b. a substantially circular hub having opposite axially spaced surfaces;
   c. at least one hard disk having a central circular opening of lesser diameter than the diameter of said circular hub;
   d. a compliant bonding agent bonding said hard disk adjacent said circular opening to one of said axially spaced surfaces of said substantially circular hub, concentrically with respect to the center of said hub and functioning as the sole attachment of said hard disk to said hub;
e. means for concentrically positioning said hub on said rotatable member and
f. means for releasably securing said hub to said rotatable member independently of said hard disk.

5. The invention according to claim 4 comprising:
a. a second hard disk having a central circular opening of lesser diameter than the diameter of said substantially circular hub; and
b. a compliant bonding agent solely bonding said second hard disk adjacent said circular opening to the remaining surface of said axially spaced surfaces of said substantially circular hub, concentrically with respect to the center of said hub.

6. The invention according to claim 4, in which:
a. said hard disk drive is of substantially a 1.3 inch form factor, and
b. said at least one hard disk is about 34 millimeters in diameter.

7. The invention according to claim 4, in which:
a. said hard disk drive is of substantially a 1.8 inch form factor, and
b. said at least one hard disk is about 48 millimeters in diameter.

8. The invention according to claim 4, in which:
a. said means for concentrically positioning said substantially circular hub on said rotatable member comprises a cylindrical extremity on said rotatable member;
b. said substantially circular hub having a cup-shaped crossection and being disposed in secure contact over said cylindrical extremity of said rotatable member.

9. The invention according to claim 8, in which:
a. said means for releasably securing comprises a screw passing through said hub and threaded in an axial direction into said cylindrical extremity of said rotatable member.

10. The invention according to claim 8, in which:
a. said means for releasably securing comprises threaded engagement of said hub with said cylindrical extremity of said rotatable member.

* * * * *